(12) United States Patent
Kim et al.

(10) Patent No.: US 8,159,788 B2
(45) Date of Patent: Apr. 17, 2012

(54) ACTUATOR LATCH SYSTEM OF HARD DISK DRIVE INCLUDING A LATCH LEVER HAVING TWO OFFSET HOOKS AT AN END OF THE LATCH LEVER

(75) Inventors: Do-wan Kim, Hwaseong-si (KR); Chul-woo Lee, Seongnam-si (KR); Ki-tag Jeong, Hwseong-si (KR)

(73) Assignee: Seagate Technology International, Grand Cayman (KY)

( * ) Notice: Subject to any disclaimer, the term of this patent is extended or adjusted under 35 U.S.C. 154(b) by 887 days.

(21) Appl. No.: 12/022,214

(22) Filed: Jan. 30, 2008

(65) Prior Publication Data
US 2008/0186632 A1    Aug. 7, 2008

(30) Foreign Application Priority Data
Feb. 1, 2007    (KR) .................. 10-2007-0010647

(51) Int. Cl.
*G11B 5/54*    (2006.01)
(52) U.S. Cl. .................. 360/256.5; 360/256.4
(58) Field of Classification Search ........ 360/256–256.6
See application file for complete search history.

(56) References Cited

U.S. PATENT DOCUMENTS

| 5,612,842 A | 3/1997 | Hickox et al. |
| 5,882,080 A | 3/1999 | Houghtaling et al. |
| 6,535,359 B1 * | 3/2003 | Boutaghou ............... 360/256.4 |

FOREIGN PATENT DOCUMENTS

| JP | 2001-014815 A | 1/2001 |
| KR | 1020010051743 A | 6/2001 |

* cited by examiner

*Primary Examiner* — Allen Heinz
(74) *Attorney, Agent, or Firm* — Volentine & Whitt, PLC (57) ABSTRACT

An actuator latch system of a hard disk drive (HDD) retains a rotatable swing arm of the HDD in place when a magnetic head of the HDD is parked. The actuator latch system includes a portion of the swing arm that defines a notch at an end portion of a swing arm, and a latch lever that has first and second hooks at one end thereof. The latch lever is disposed on the base member adjacent the end portion of the swing arm and is supported so as to be rotatable. The first hook is disposed to contact the swing arm within a short period of time after a shock transmitted to the swing arm while the magnetic head is parked causes the swing arm to rotate in one direction. Thus, the impulse on the swing arm is minimized and the reliability of the actuator latch system is enhanced.

13 Claims, 7 Drawing Sheets

ACTUATOR LATCH SYSTEM OF HARD DISK DRIVE INCLUDING A LATCH LEVER HAVING TWO OFFSET HOOKS AT AN END OF THE LATCH LEVER

BACKGROUND OF THE INVENTION

1. Field of the Invention

The present invention relates to a hard disk drive. More particularly, the present invention relates to an actuator latch system of a hard disk drive, which locks an actuator of the hard disk drive in place when the disk of the hard disk drive is not rotating.

2. Description of the Art

Hard disk drives (HDD) are used in electronic devices such as computers to reproduce data from a disk or record data onto the disk. More specifically in addition to such a disk, an HDD includes a magnetic (read/write) head, an actuator for moving the magnetic head over a desired location (track) of the disk, and a spindle motor for rotating the disk. The magnetic head is floated a predetermined height from the recording surface of the disk while the disk is rotated, and detects/modifies the magnetization of the recording surface of the disk to reproduce/record data from/onto the disk.

In addition, when the HDD is not in use, that is, when the disk is not rotating, the magnetic head is parked off of the recording surface of the disk. Systems for parking the magnetic head of the HDD include a contact start stop (CSS) type of parking system and a ramp type of parking system. In the CSS type of parking system, an inner circumferential portion of the disk devoid of recorded data is reserved as a parking zone, and the magnetic head is held against the parking zone of the disk when the magnetic head is parked. In the ramp type of parking system, a ramp is disposed radially outwardly of the disk, and the magnetic head is held against the ramp when the magnetic head is parked.

However, an HDD can be subjected to external shock or vibrations when the HDD is not in use. Such external shock or vibrations have the potential to move the magnetic head out of the parking zone or off of the ramp and onto the recording surface of the disk. If this were allowed to happen, the magnetic head or the recording surface of the disk could be damaged. Therefore, the actuator needs to be locked in place when the magnetic head is parked. To this end, HDDs include various kinds of actuator latch systems.

Figure 1A:
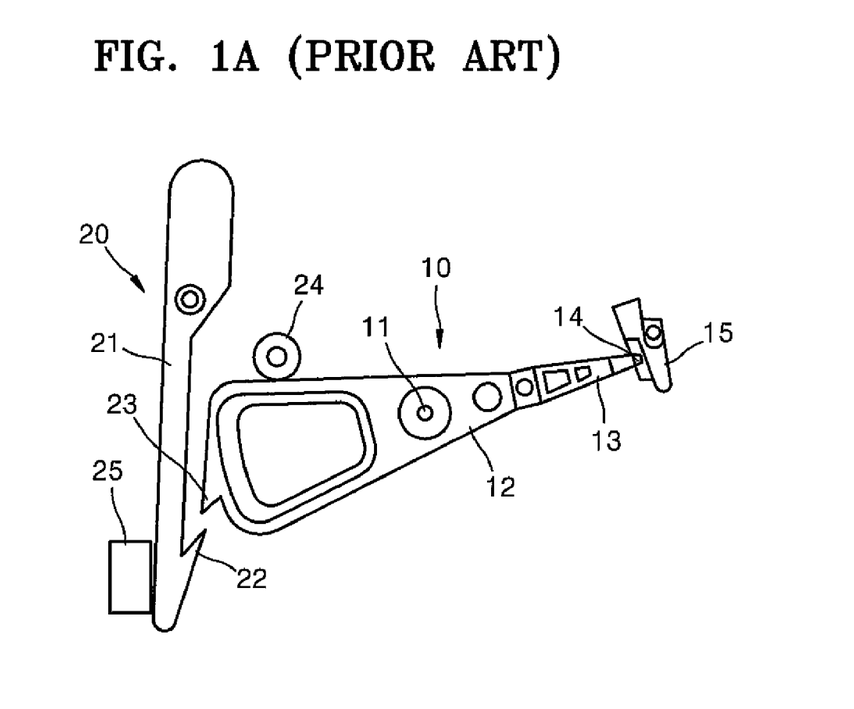
FIGS. 1A, 1B, and 1C are each a plan of a conventional single lever inertial latch system of a hard disk drive (HDD), and together illustrate the operation of the latch system.
Figure 1B:
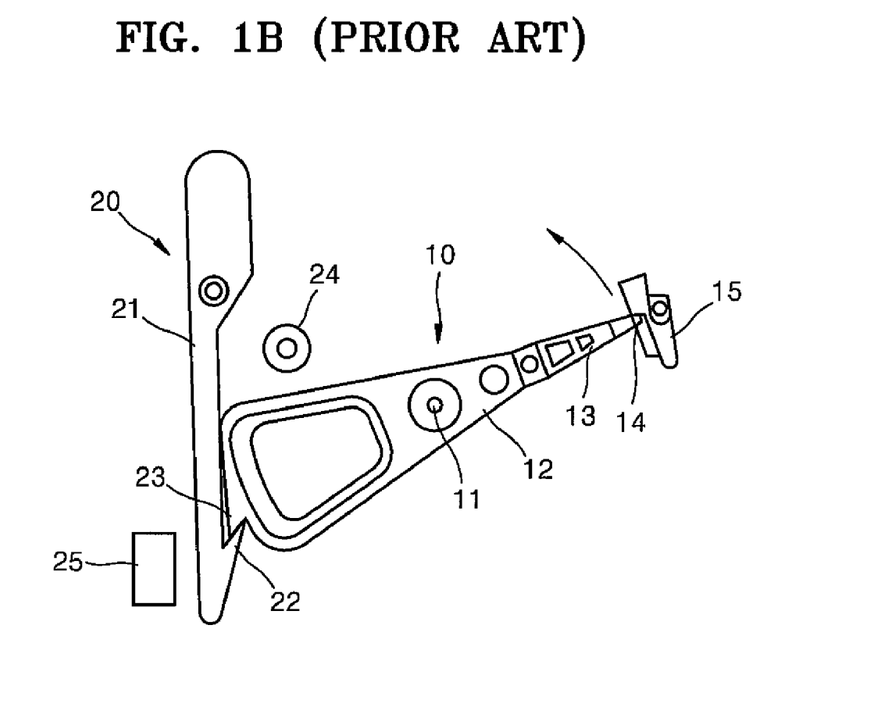
Figure 1C:
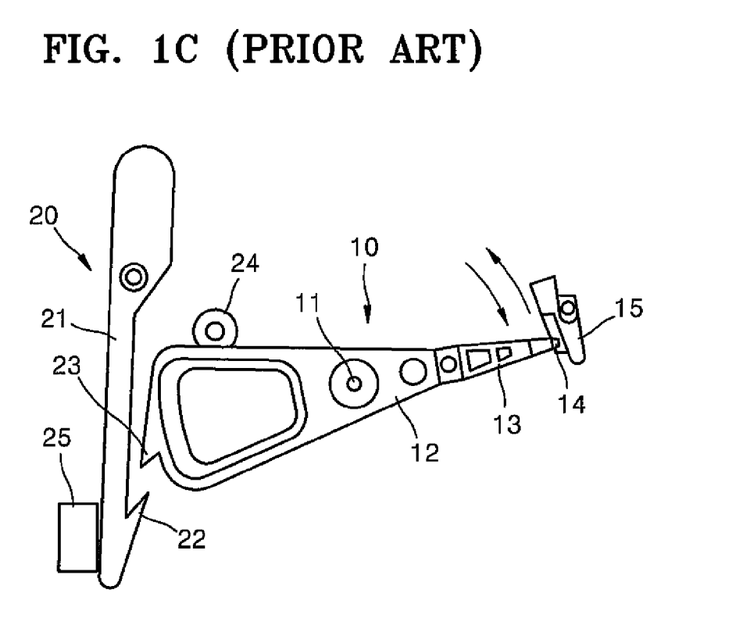

FIGS. 1A, 1B, and 1C illustrate a conventional latch system of an HDD for locking the actuator of the HDD in place when the magnetic head is parked.

Referring to FIG. 1A, the actuator 10 of the HDD includes a swing arm 12 that is rotatably supported by a pivot 11, a suspension 13 disposed on an end portion of the swing arm 12, and a slider 14 supported by the suspension 13. The head slider 14 contains the magnetic head. The suspension biases the head slider 14 and hence, the magnetic head, toward a (recording) surface of the disk during a read/write operation in which the magnetic head is recording data onto the disk or reading data from the disk.

In addition, the HDD includes a single lever inertial latch system 20 for locking the actuator 10 in place when the magnetic head is parked on ramp 15. The inertial latch system 20 includes a latch lever 21 supported so as to be freely rotatable, a latch hook 22 integral with the latch lever 21, a notch 23 in the swing arm 12 of the actuator 10, a crash stop 24 that limits the rotation of the swing arm 12 in a clockwise direction, and a latch stop 25 that limits the rotation of latch lever 21 in the clockwise direction.

As shown in FIG. 1B, when shock applied to the HDD causes the swing arm 12 of the actuator 10 and the latch lever 21 to rotate counter-clockwise due to inertia, the latch hook 22 is received in the notch 23 such that the rotation of the swing arm 12 of the actuator 10 is arrested. On the other hand, as shown in FIG. 1C, when shock applied to the HDD causes the swing arm 12 of the actuator 10 and the latch lever 21 to rotate clockwise due to inertia, the swing arm 12 collides with the crash stop 24, and then rebounds from the crash stop 24 and thus rotates counter-clockwise. At the same time, the latch lever 21 rebounds from the latch stop 25 and thus rotates counter-clockwise. In this case, the latch hook 22 can be received in the notch 23 to arrest the further rotation of the actuator 10 in the counter-clockwise direction. However, the conventional single lever inertial latch system 20 is unreliable.

In the case in which the shock applied to the HDD causes the swing arm 12 to initially rotate counter-clockwise, the rotation of the swing arm 12 is indeed arrested by the latch lever 21 as described above. However, the impulse generated by the engagement between the swing arm 12 and the latch hook 22 causes the latch lever 21 and the swing arm 12 to spring back. Thus, the swing arm 12 rotates clockwise. The swing arm 12 collides with the crash stop 24, rebounds, and then again rotates counter-clockwise. In this case, though, the rotation of the swing arm 12 and the rotation of the latch lever 21 are poorly timed. As a result, the swing arm 12 is not hooked by the latch hook 22. Therefore, the swing arm 12 continues to rotate counter-clockwise such that the magnetic head moves off of the ramp 15 and onto the recording surface of the disk. Accordingly, the magnetic head or the recording surface of the disk can be damaged.

Figure 2A:
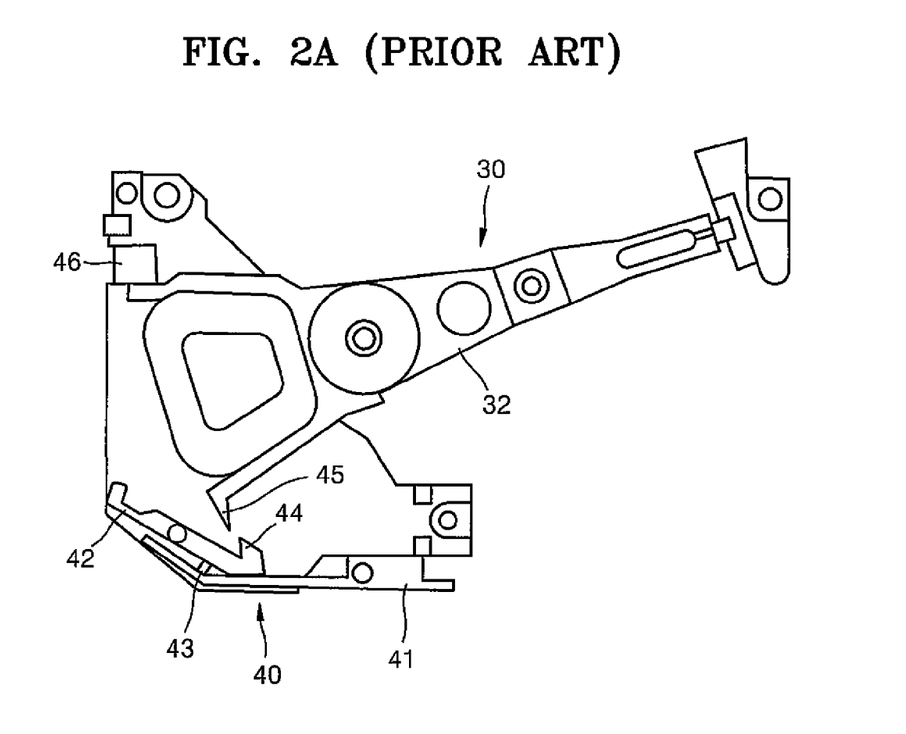
FIGS. 2A, 2B, and 2C are each a plan view of a conventional dual-lever inertial latch system of an HDD, and together illustrate the operation of the latch system.
Figure 2B:
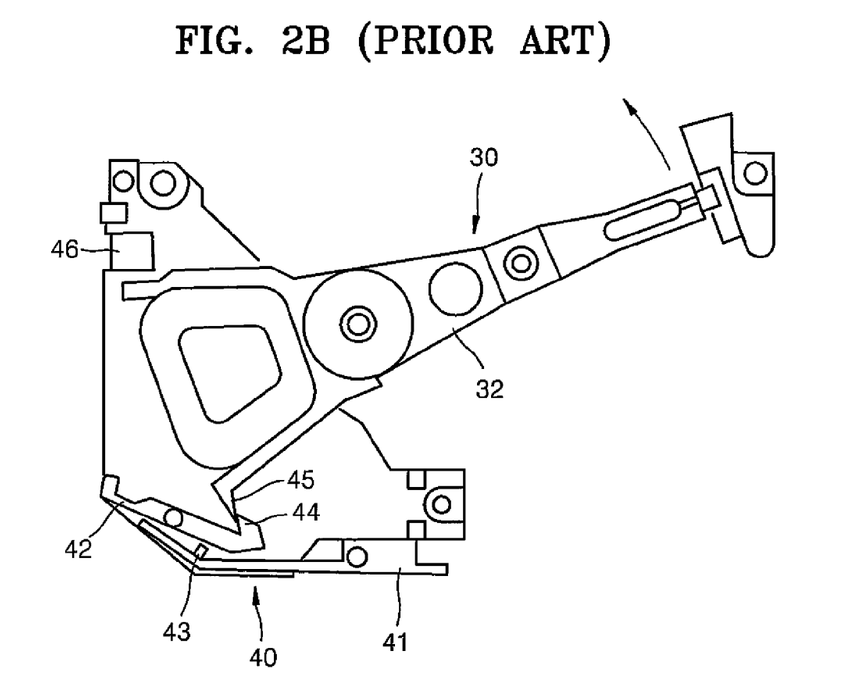
Figure 2C:
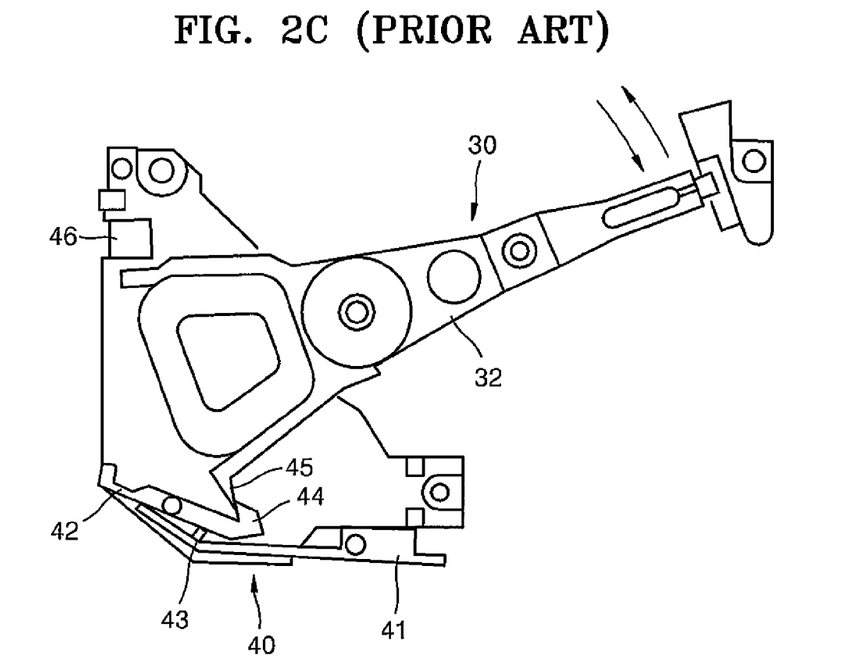

FIGS. 2A, 2B, and 2C show a dual-lever inertial latch system 40 that is designed to obviate the above-described problem of the single lever inertial latch system.

Referring to FIG. 2A, the dual-lever inertial latch system 40 includes first and second latch levers 41 and 42 that are supported so as to be freely rotatable, a latch pin 43 integral with the first latch lever 41, a latch hook 44 integral with the second latch lever 42, a notch 45 in a swing arm 32 of the actuator 30, and a crash stop 46 limiting the rotation of the swing arm 32 in the clockwise direction.

As shown in FIG. 2B, when shock applied to the HDD causes the swing arm 32 of the actuator 30 and the first and second latch levers 41 and 42 to rotate counter-clockwise due to inertia, the latch hook 44 is received in the notch 45 in the swing arm 32. Thus, the swing arm 32 of the actuator 30 cannot rotate further. On the other hand, as shown in FIG. 2C, when shock applied to the HDD causes the swing arm 32 of the actuator 30 and the first latch lever 41 to rotate clockwise due to inertia, the swing arm 32 initially rotates clockwise, then collides with the crash stop 46, rebounds from the crash stop 46, and thus rotates counter-clockwise. In addition, the first latch lever 41 rotates clockwise, and the latch pin 43 engages the second latch lever 42 to make the second latch lever 42 rotate in the counter-clockwise direction. Accordingly, the latch hook 44 of the second latch lever 42 is received in the notch 45 and thus, the rotation of the swing arm 32 in the counter-clockwise direction is arrested.

The conventional dual-lever inertial latch system 40 operates reliably regardless of the direction in which shock is applied to the HDD. However, two latch levers 41 and 42 are required. That is, the structure of the dual lever latch system 40 is complex and bulky. Accordingly, the dual-lever inertial latch system 40 is expensive. Also, it is difficult to incorporate the dual-lever inertial latch system into a small disk drive such as those used in mobile devices.

SUMMARY OF THE INVENTION

An object of the present invention is to provide a more reliable actuator latch system in a hard disk drive (HDD).

According to an aspect of the present invention, in a hard disk drive (HDD) having a base, a swing arm supported on the base so as to be rotatable about an axis of rotation, and a magnetic head supported by the swing arm, there is provided an actuator latch system which includes an integral part of the swing arm that delimits a notch at a rear end portion of the swing arm, and a latch lever having two hooks formed an end thereof so as to selectively engage the swing arm within the notch.

The first and second hooks are offset from one another in a direction of rotation of the swing arm. Also, the second hook is disposed further from the swing arm in the direction of rotation of the swing arm but closer to the axis of rotation of the swing arm than the first hook. Preferably, the first hook is positioned so that the time it takes for the first hook to enter the notch and engage the swing arm after a shock of a given magnitude is about 1.5 ms or less. Therefore, the impulse on the swing arm is minimal.

BRIEF DESCRIPTION OF THE DRAWINGS

The above and other objects features and advantages of the present invention will become more apparent from the following detailed description of the preferred embodiments thereof made with reference to the attached drawings in which.

DETAILED DESCRIPTION OF THE PREFERRED EMBODIMENTS

A hard disk drive (HDD) having an actuator latch system according to the present invention will be described in detail hereinafter with reference to FIGS. 3-9.

Figure 3:
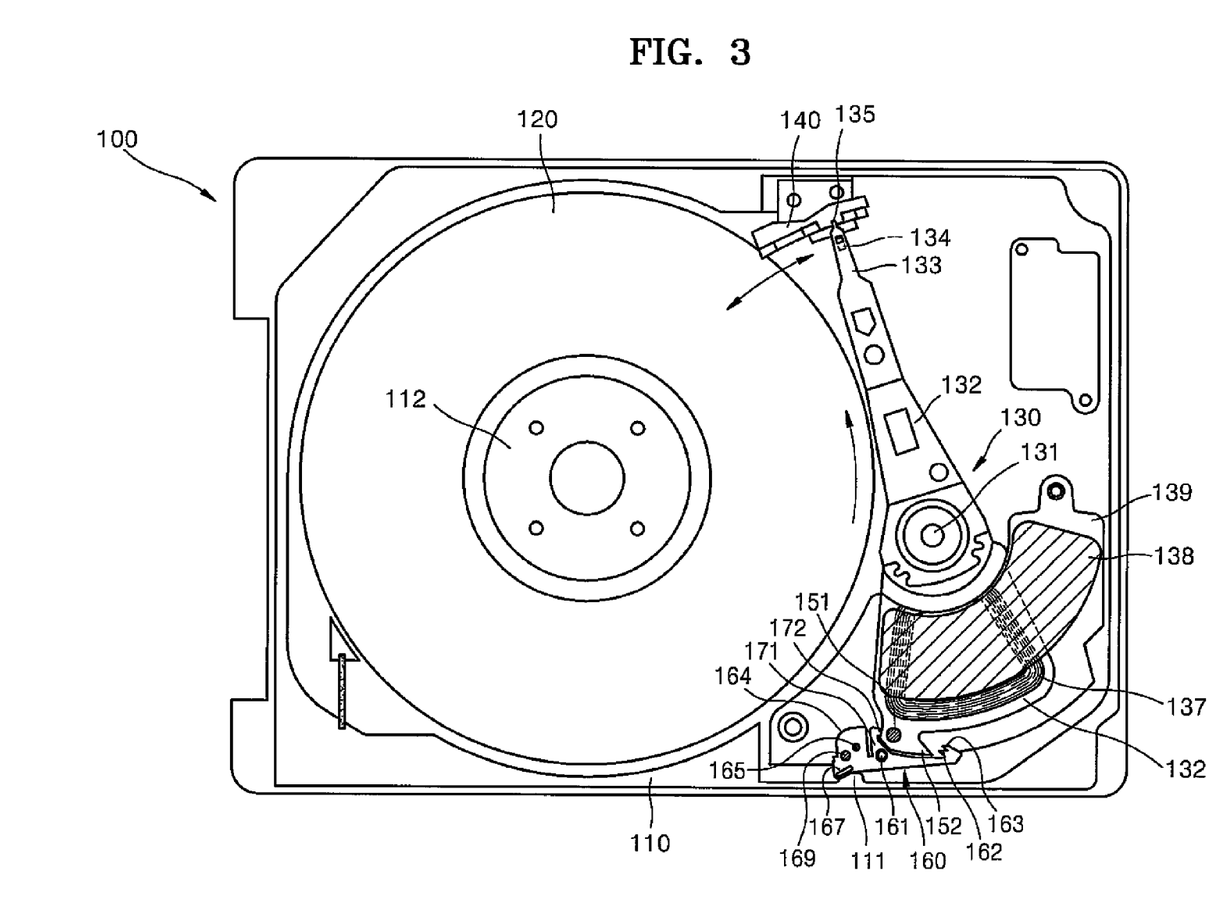
FIG. 3 is a plan view of an HDD including an actuator latch system according to the present invention.
Figure 4:
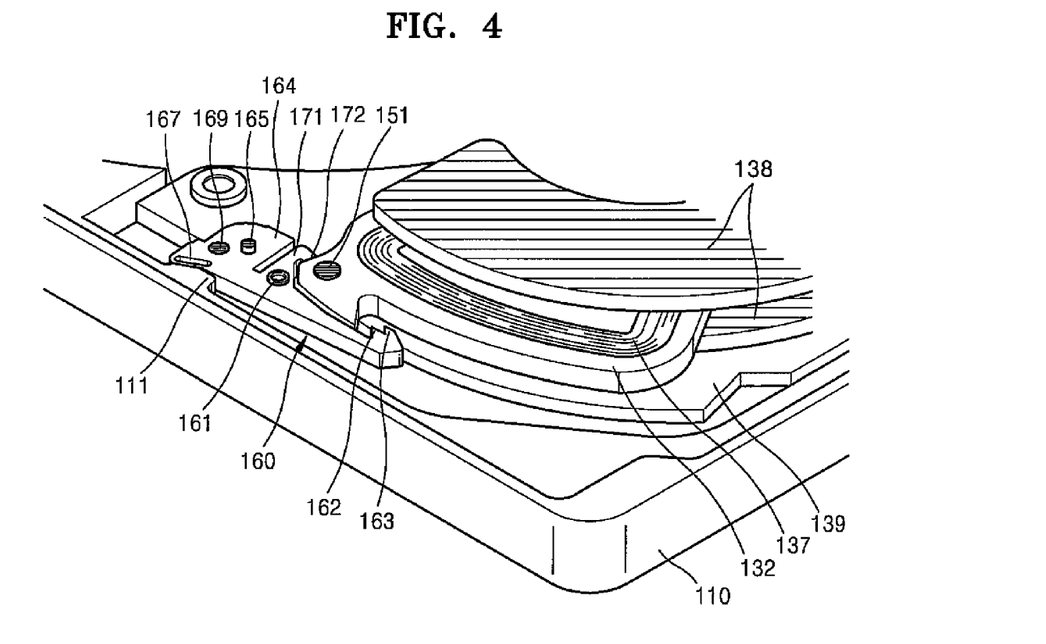
FIG. 4 is a perspective view of the actuator latch system of the HDD shown in FIG. 3.
Figure 5:
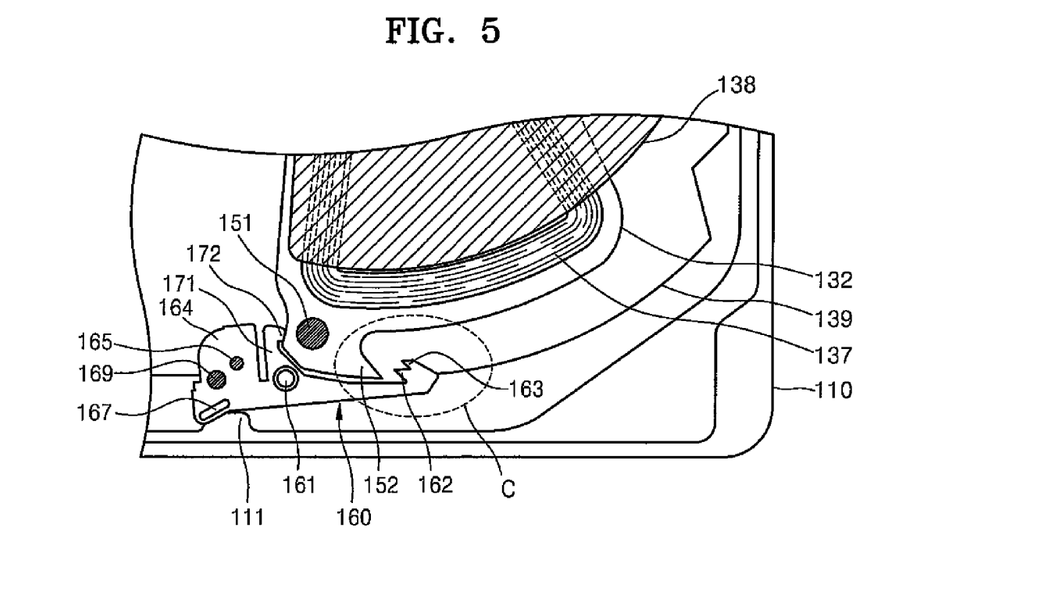
FIG. 5 is a plan view of the actuator latch system according to the present invention.

Referring first to FIGS. 3 through 5, the HDD 100 includes a base 110, a spindle motor 112 mounted to the base 110, a disk 120 mounted to the spindle motor 112 so as to be rotated by the spindle motor 112, a magnetic head, and an actuator 130 that moves the magnetic head over the disk 120 to facilitate the recording/reproducing data onto/from the disk 120. The actuator 130 includes a pivot 131 disposed on the base 110, a swing arm 132 supported by the pivot 131 so as to be rotatable, a head slider 134 that contains the magnetic head, a suspension assembly 133 disposed on a front end portion of the swing arm 132 and which supports the head slider 134, and a voice coil motor (VCM) that rotates the swing arm 132 about the central longitudinal axis of the pivot 131. The elasticity of the suspension assembly 133 biases the magnetic head towards a surface of the disk 120 during a read/write operation in which data is being recorded onto or read from the surface of the disk.

The VCM includes a VCM coil 137 disposed on a rear end portion of the swing arm 132, and a magnet or magnets 138 disposed above and/or below the VCM coil 137 so as to face the VCM coil 137. The magnet(s) 138 is/are attached to a yoke 139 that is, in turn, fixed to the base 110. The VCM is controlled by a servo control system that controls the supply of current to the VCM coil 137, and rotates the swing arm 132 in a direction according to Fleming's left-hand rule due to an interaction between the electric current flowing through the VCM coil 137 and the magnetic field formed by the magnets 138. In particular, when the HDD 100 is turned on and the disk 120 starts rotating, the VCM rotates the swing arm 132 counter-clockwise to move the magnetic head onto a recording surface of the disk 120. On the other hand, when the HDD 100 is turned off and the disk 120 stops rotating, the VCM rotates the swing arm 132 clockwise so that the magnetic head is moved off of the recording surface of the disk 120 and is parked. More specifically, when the disk 120 stops rotating, the swing arm 132 is rotated clockwise by the VCM, and an end-tab 135 of the suspension assembly 133 is slid up and onto the ramp 140 where it remains to thereby park the magnetic head.

The HDD 100 also includes an actuator latch system. The actuator latch system retains the actuator 130 when the magnetic head 140 is parked. That is, the actuator latch system prevents external shock or vibrations from rotating the swing arm 132 when the HDD 100 is not in use, i.e., when the magnetic head is parked. In particular, the actuator latch system prevents the magnetic head from being moved into contact with the recording surface of the disk 120 which situation could otherwise result in the recording surface and/or the magnetic head being damaged.

The actuator latch system includes a member defining a notch 152 at a rear end portion of the swing arm 132, and a latch lever 160 rotatably supported on the base 110 by a pivot 161. The rear end portion of the swing arm 132 is generally formed of an injection-molded plastic such that the member defining the notch 152 is easily formed unitarily with the swing arm 132 during the injection molding process. The latch lever 160 has first and second hooks 162 and 163 disposed at one end thereof and a counterbalance 164 at the other end thereof.

The rotation of the swing arm 132 in the clockwise direction due to inertia, when a shock is applied to the HDD while the magnetic head is parked, is restricted by the counterbalance 164. More specifically, the counterbalance 164 collides with a side of the rear end of the swing arm 132 as the swing arm rotates clockwise to prevent the swing arm 132 from rotating further in the clockwise direction. The counterbalance 164 may include a buffering arm 171 for buffering the shock generated when the counterbalance 164 and the swing arm 132 collide. To this end, the buffering arm 171 is preferably formed of an elastic material, for example, a plastic material. Also, the buffering arm 171 may have a protrusion 172 that projects toward the side of the rear end of the swing arm 132. The protrusion 172 reduces the area of contact between the buffering arm 171 and the swing arm 132 in order to minimize the amount of particles that are produced when the buffering arm 171 and the swing arm 132 collide.

The latch system may also have a stopper 111 positioned on the base 110 to block the counterbalance 164. More specifically, the stopper 111 collides with the counterbalance 164 of the latch lever 160 when the latch lever 160 rotates counter-clockwise due to inertia. Thus, the stopper 111 limits the rotation of the latch lever 160 in the counter-clockwise direction. In addition, the counterbalance 164 may have a hole 167 extending therein in the direction of the thickness of the latch lever 160. The hole 167 helps the counterbalance 164 absorb shock when the counterbalance 164 collides with the stopper 111 and thus, prevents the latch lever 160 from being damaged and helps to minimize noise.

Furthermore, the latch system may also have a first core 151 and a second core 165 disposed, respectively, in the swing arm 132 and the latch lever 160. The first core 151 is disposed in a corner of the rear end portion of the swing arm 132. The first core 151 may be a magnetic body, for example, a steel body, so that a magnetic force of attraction is generated between the first core 151 and the magnet(s) 138. Therefore, the first core 151 applies torque to the swing arm 132 in the clockwise direction. The torque prevents the actuator 130 from being moved by weak shocks and vibrations.

The second core 165 may be also formed of a magnetic body, for example, a steel body, so that a magnetic force of attraction is generated between the second core 165 and the magnet(s) 138. Therefore, the second core 165 applies a torque to the latch lever 160 in the clockwise direction. Therefore, the locked state of the actuator 130 can be maintained. Preferably, the size of the first core 151 is larger than that of the second core 165 so that the torque applied to the swing arm 132 is greater than that applied to the latch lever 160.

The latch system may also include a weight 169 installed on the latch lever 160. Preferably, the weight 169 is installed on the counterbalance 164 of the latch lever 160. Thus, the inertia of the latch lever 160 can be set by providing a weight 169 of a given mass.

Figure 6:
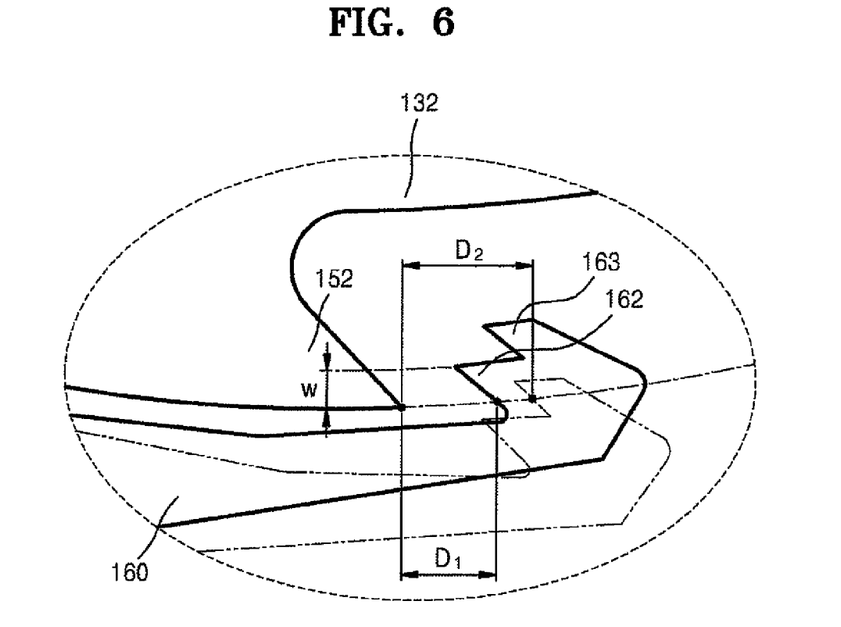
FIG. 6 is an enlarged view of portion C of FIG. 5 and illustrate in detail features of the actuator latch system according to the present invention.

The first and second hooks 162 and 163 of the latch system will now be described in more detail with reference to FIGS. 6 and 7. The hooks 162 and 163 are offset from one another on the latch lever 160 in a direction of rotation of the swing arm 132. More specifically, the outer peripheral edge or surface of the swing arm 132 that defines the notch 152 has an inflection point where two portions of the outer edge or surface meet and at which the notch 152 begins. The first hook 162 is located closer than the second hook 163 to the inflection point, as measured in the direction of rotation of the swing arm 132 when the respective hook is disposed in the path along which the inflection point moves. Furthermore, each hook 162, 163 points in substantially the clockwise of rotation of the swing arm (as indicated by the chained line extending from the tip of the hook), and the notch 152 opens outwardly in substantially the counterclockwise direction of rotation (e.g., at the solid line between D2 and the inflection point).

The distance D1 between the first hook 162 and the inflection point, when the inflection point is at a given relative position and the first hook 162 is disposed in the path of movement of the inflection point (solid lines in FIG. 6), is relatively short such that the first hook 162 and the swing arm 132 will contact each other within a short time after the swing arm 132 of the actuator 130 is rotated by a shock while the magnetic head is parked. Accordingly, the impulse of the swing arm 132 is minimal. This aspect of the present invention will be described in more detail with reference to FIG. 7.

Figure 7:
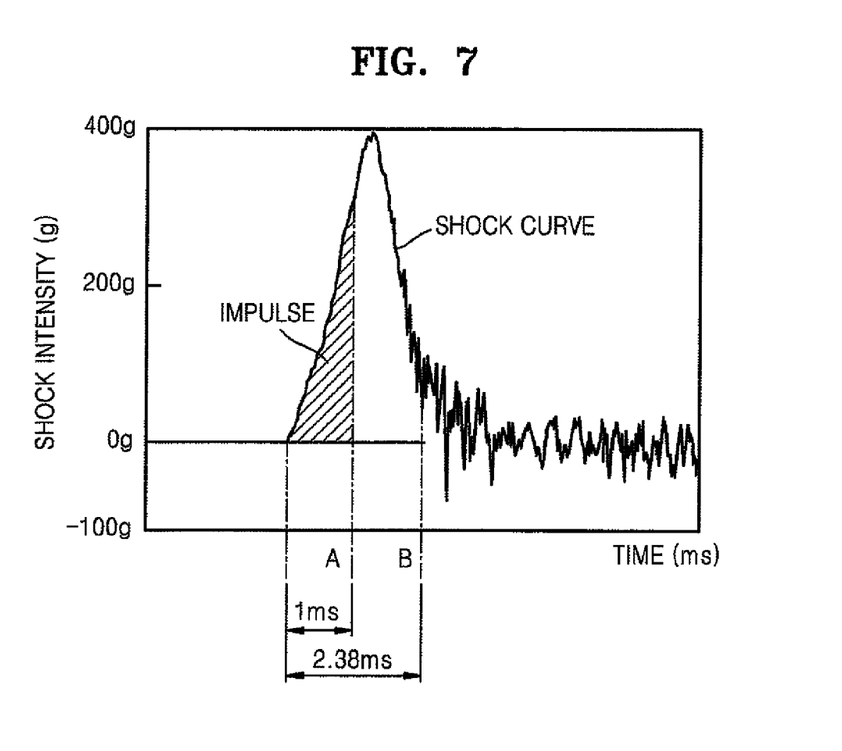
FIG. 7 is a graph illustrating an interrelation between an impulse on the swing arm of the actuator and time of contact between the swing arm and the hook of the actuator latch system after a shock is applied to the actuator.

In the graph of FIG. 7, the intensity of the shock transferred to the swing arm 132 is plotted along the vertical axis, and the time during which the shock acts on the swing arm 132 is plotted along the horizontal axis. Thus, the area under the curve represents the impulse. As can be seen from FIG. 7, the impulse on the swing arm 132 increases from the time at which the shock is initially applied to the actuator. The latch lever 160 arrests the shock a short time after the shock has been applied to the swing arm 132. Therefore, the impulse is quickly reduced.

In the conventional hard disk drive, the swing arm and the hook of the latch lever contact each other at a point in time represented by point B, i.e., 2.38 ms after the shock is applied to the actuator. Therefore, the swing arm and the hook of the latch lever contact each other in a state in which a large amount of impulse has been generated. Thus, the swing arm and the latch lever rebound strongly from each other due to the large impulse.

On the other hand, according to the embodiment of the present invention, the swing arm 132 and the first hook 162 contact each other at a point in time represented by point A, i.e., within about 1.5 ms and is close to 1 ms, after a shock is applied to the actuator 130. Thus, the impulse on the swing arm 132 of the actuator 130 is no more than half the impulse on the swing arm in the conventional HDD under similar circumstances. Even if the swing arm 132 and the latch lever 160 rebound from one another and thereby rotate in clockwise directions, the rotational energy at this time is much less than that generated in the conventional HDD. Therefore, even if the swing arm 132 and the buffering arm 171 of the latch lever 160 collide with each other, a secondary rotation of the swing arm 132 and the latch lever 160 in the counter-clockwise directions caused by the rebounding of the swing arm 132 and the buffering arm 171 is minimized.

Meanwhile, for various reasons, the swing arm 132 may not be hooked by the first hook 162 when the swing arm 132 is rotated counter-clockwise by an external shock applied to the HDD while the magnetic head is parked. In this case, the second hook 163 engages with the swing arm 132 within the notch 152 to prevent the swing arm 132 from rotating further (as shown by the dashed lines in FIG. 6). For this reason, the distance D2 between the second hook 163 and the inflection point of the swing arm 132, when the inflection point is at a given relative position and the second hook 163 is disposed in the path of movement of the inflection point (dashed lines in FIG. 6), is shorter than the distance D1 between the first hook 162 and the inflection point when the inflection point is at the given relative position and the first hook 162 is disposed in the path of movement of the inflection point (solid lines in FIG. 6). Also, the second hook 163 is located closer to the pivot 131 of the swing arm 132 than the first hook 162, in a state in which the magnetic head is parked.

The operation of the actuator latch system will be described now with reference to FIGS. 8 and 9.

Figure 8:
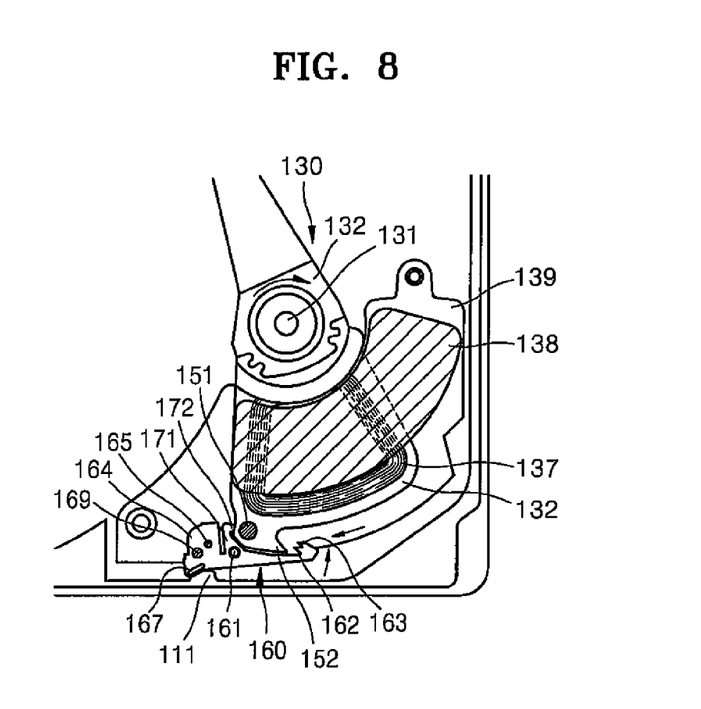
FIGS. 8 and 9 are each a plan view of an HDD having an actuator latch system according to the present invention and together illustrate the operation of the actuator latch system.

Referring first to FIG. 8, the HDD 100 stops operating, and the swing arm 132 is rotated by the VCM clockwise about the axis of the pivot 131 to park the magnetic head on the ramp 140 (refer to FIG. 3). At this time, the side of the rear end of the swing arm 132 contacts the protrusion 172 projecting from the buffering arm 171 of the latch lever 160, and thereby rotates the latch lever 160 counter-clockwise about the axis of the pivot 131. Then the counterbalance 164 of the latch lever 160 contacts the stopper 111 such that the rotation of the latch lever 160 in the counter-clockwise direction is arrested.

The VCM is turned off when the magnetic head is parked on the ramp 140. At this time, the swing arm 132 is maintained in position by the torque applied to the swing arm 132 in the clockwise direction by the first core 151 and the magnet(s) 138. In addition, as described above, the torque that is applied to the swing arm 132 is larger than that applied to the latch lever 160 by the second core 161 and the magnet(s) 138. Therefore, the swing arm 132 remains stably locked in position.

Meanwhile, the swing arm 132 can be rotated counter-clockwise due to inertia in the state in which the magnetic head is parked, when a shock applied to the HDD 100 generates torque that is greater than the torque applied to the swing arm 132 by the first core 151 and the magnet 138. Accordingly, the swing arm 132 is hooked by the first hook 162 of the latch lever 160. Thus, the rotation of the swing arm 132 in the counter-clockwise direction is arrested. As described above, the impulse on the swing arm 132 of the actuator 130 is minimal because the swing arm 132 contacts the first hook 162 within a short time after the shock has been transferred to the swing arm 132. Accordingly, the rotation of the swing arm 132 in the opposite direction, that is, in the clockwise direction, due to the collision between the swing arm 132 and the first hook 162 occurs with little energy.

On the other hand, the shock applied to the HDD 100 can generate torque that acts on the swing arm 132 and the latch lever 160 in the clockwise direction. In this case, though, the swing arm 132 and the latch lever 160 do not rotate in the clockwise direction because the side of the rear end of the swing arm 132 is in contact with the buffering arm 171 of the latch lever 160, and the buffering arm 171 of the latch lever 160 absorbs the shock to some degree. In addition, the swing arm 132 may rebound from the buffering arm 171 so as to rotate counter-clockwise. However, in this case, the swing arm 132 is hooked by the first hook 162 of the latch lever 160 such that the swing arm 132 is prevented from rotating further in the counter-clockwise.

Figure 9:
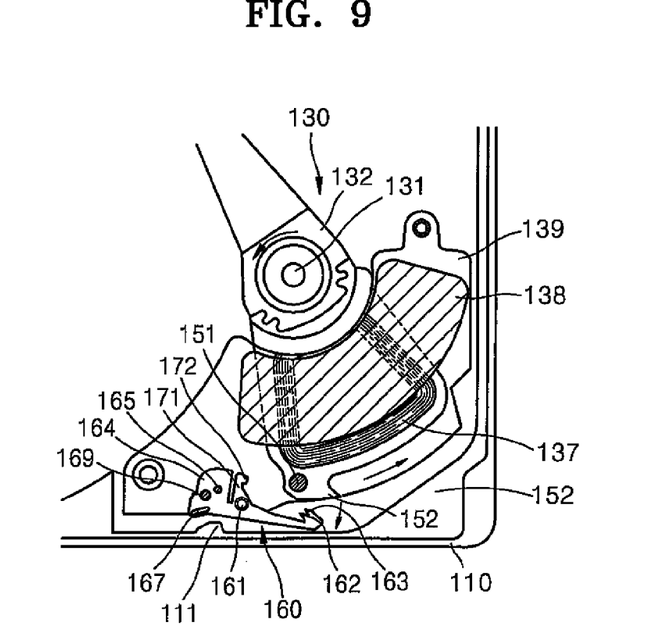

FIG. 9 illustrates how the actuator latch system according to the present invention releases the swing arm 132.

Current is supplied in one direction to the VCM coil 137 to operate the HDD 100. The interaction between the current and the magnetic field generated by the magnet(s) 138 creates an electromotive force on the swing arm 132 which is greater than the torque applied to the swing arm 132 due to the magnetic force of attraction between first core 151 and the magnet(s) 138. Thus, the swing arm 132 rotates clockwise. At the same time, the latch lever 160 is rotated clockwise by the torque created by the magnetic force of attraction between the second core 165 and the magnet 138. Thus, the swing arm 132 is not engaged by the first and second hooks 162 and 163 of the latch lever 160. In addition, even though the distance D1 between the swing arm 132 and the first hook 162 is comparatively shorter than that in the conventional HDD, the width W of that portion of the notch 152 which receives the first hook 162 is also comparatively smaller than that in the conventional HDD so that the swing arm 132 will not be engaged by the first hook 162.

According to the present invention as described above, the latch lever of the actuator latch system has two hooks which offer an improvement in the reliability of the operation of the latch system. In particular, the first hook is disposed relatively close to the swing arm so as to contact the swing arm within a short period of time after the swing arm is rotated due to a shock applied to the HDD while the magnetic head of the HDD is parked. Accordingly, the impulse on the swing arm is minimal. Therefore, the force by which the swing arm and the latch lever rebound from one another is minimal and hence, the swing arm will not be prematurely released by the actuator latch system.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. In a hard disk drive (HDD) having a base, a swing arm supported on the base so as to be rotatable in opposite directions about an axis of rotation, and a magnetic head supported by the swing arm, an actuator latch system comprising:
   a member integral with the swing arm and defining a notch at a rear end portion of the swing arm; and
   a latch lever disposed adjacent the rear end portion of the swing arm when the swing arm is in a position at which the magnetic head is parked, the latch lever having an arm portion mounted to the base so as to be rotatable about an axis of rotation, and first and second hooks at one end of the arm portion, each of the hooks being generally triangularly shaped with one of its corners forming a tip end projecting away from the arm portion substantially in one of the opposite directions in which the swing arm is rotatable, and the notch including a bight opening outwardly in substantially the other of the opposite directions, whereby the hooks selectively extend within the bight to engage said notch when the HDD experiences shocks while the magnetic head is parked, to thereby retain the swing arm in a position at which the magnetic head remains parked.

2. The actuator latch system in an HDD as claimed in claim 1, wherein the first and second hooks are offset from one another in the directions of rotation of the swing arm.

3. The actuator latch system in an HDD as claimed in claim 1, wherein the second hook is disposed closer to the axis of rotation of the swing arm than the first hook.

4. The actuator latch system in an HDD as claimed in claim 1, wherein the second hook of the latch lever is offset from the first hook in said other of the directions in which the swing arm is rotatable, and the second hook is disposed closer to the axis of rotation of the swing arm than the first hook.

5. The actuator latch system in an HDD as claimed in claim 1, wherein the member has a peripheral surface two portions of which meet at an inflection,
   one of the two portions of the peripheral surface delimits one side of the notch such that the notch begins at the inflection,
   the inflection is disposed ahead of all other points along said two portions of the outer peripheral surface of said, with respect to said other of the opposite directions, when either of the hooks is engaged with said member within the notch,
   the arm portion of the latch lever extends longitudinally from the axis of rotation thereof to said one end thereof in said other of the directions in which the swing arm is rotatable, and
   each of the hooks has the tip end, and consists of a portion of the latch lever that projects from said one end of the arm portion of the latch lever to the tip end approximately in said one of the directions in which the swing arm is rotatable.

6. The actuator latch system in an HDD as claimed in claim 5, wherein the first hook of the latch lever has a surface that is contacted at a point thereon by the inflection when the first hook engages said member within the notch, the second hook of the latch has a surface that is contacted at a point thereon by the inflection when the second hook engages said member within the notch, the point at which the inflection contacts the surface of the second hook is offset from the point at which the inflection contacts the first hook in said other of the directions in which the swing arm is rotatable, and the second hook is disposed closer to the axis of rotation of the swing arm than the first hook.

7. A hard disk drive (HDD) comprising:
a base;
a spindle motor mounted to the base;
a disk mounted to the spindle motor so as to be rotated by the spindle motor;
a swing arm supported on the base so as to be rotatable in opposite directions about an axis of rotation, and a magnetic head supported by the swing arm, the swing arm defining a notch at a rear end portion thereof;
a voice coil motor (VCM) that rotates the swing arm, the VCM including a voice coil disposed on the rear end portion of the swing arm, and at least one magnet supported on the base and facing the voice coil; and
a latch lever disposed adjacent the rear end portion of the swing arm when the swing arm is in a position at which the magnetic head is parked, the latch lever having an arm portion mounted to the base so as to be rotatable about an axis of rotation, and first and second hooks at one end of the arm portion, each of the hooks being generally triangularly shaped with one of its corners forming a tip end projecting away from the arm portion substantially in one of the opposite directions in which the swing arm is rotatable, and the notch including a bight opening outwardly in substantially the other of the opposite directions, whereby the hooks selectively extend within the bight to engage the notch when the HDD experiences shocks while the magnetic head is parked, to thereby retain the swing arm in a position at which the magnetic head remains parked.

8. The HDD as claimed in claim 7, wherein the first and second hooks of the latch lever are offset from one another in the directions of rotation of the swing arm.

9. The HDD as claimed in claim 7, wherein the second hook is disposed closer to the axis of rotation of the swing arm than the first hook.

10. The HDD as claimed in an HDD as claimed in claim 7, wherein the second hook of the latch lever is offset from the first hook in said other of the directions in which the swing arm is rotatable, and the second hook is disposed closer to the axis of rotation of the swing arm than the first hook.

11. The HDD as claimed in an HDD as claimed in claim 7, wherein the swing arm has a peripheral surface two portions of which meet at an inflection,
one of the two portions of the peripheral surface delimits one side of the notch such that the notch begins at the inflection,
the inflection is disposed ahead of all other points along said two portions of the outer peripheral surface of said member, with respect to said other of the opposite directions, when either of the hooks is engaged with the rear end portion of the swing arm within the notch,
the arm portion of the latch lever extends longitudinally from the axis of rotation thereof to said one end thereof in said other of the directions in which the swing arm is rotatable, and
each of the hooks has the tip end, and consists of a portion of the latch lever that projects from said one end of the arm portion of the latch lever to the tip end approximately in said one of the directions in which the swing arm is rotatable.

12. The HDD as claimed in claim 11, wherein the first hook of the latch lever has a surface that is contacted at a point thereon by the inflection when the first hook engages the rear end of the swing arm within the notch, the second hook of the latch has a surface that is contacted at a point thereon by the inflection when the second hook engages the rear end of the swing arm within the notch, the point at which the inflection contacts the surface of the second hook is offset from the point at which the inflection contacts the first hook in said other of the directions in which the swing arm is rotatable, and the second hook is disposed closer to the axis of rotation of the swing arm than the first hook.

13. A hard disk drive (HDD) comprising:
a base;
a spindle motor mounted to the base;
a disk mounted to the spindle motor so as to be rotated by the spindle motor, the disk having a recording surface;
a swing arm and a magnetic head supported by the swing arm, the swing arm defining a notch at a rear end portion thereof,
the swing arm being supported on the base so as to be rotatable about an axis of rotation in a first direction from a first position at which the magnetic head is in a read/write position and a second position at which the magnetic head is in a parked position, and so as to be rotatable about the axis of rotation in a second direction opposite to the first direction from the parked position to the read/write position, and
the magnetic head being located across from the recording surface of the disk when in the read/write position and being spaced from the recording surface in a radial direction of the disk when in the parked position;
a voice coil motor (VCM) that rotates the swing arm between the read/write and parked positions thereof, the VCM including a voice coil disposed on the rear end portion of the swing arm, and at least one magnet supported on the base and facing the voice coil; and
a latch lever disposed adjacent the rear end portion of the swing arm when the swing arm is in the parked position, the latch lever being mounted to the base so as to be rotatable about an axis of rotation, and the latch lever having first and second hooks at one end thereof, each of the first and second hooks being generally triangularly shaped with one of its corners forming a tip end projecting away from the latch lever toward a bight opening outwardly in the notch at the rear end portion of the swing arm,
wherein the tip ends of the hooks and the bight of the notch face towards each other when the swing arm is in the parked position,
the first and second hooks of the latch lever are offset from one another in the directions in which the swing arm is rotatable,
the second hook is disposed closer to the axis of rotation of the swing arm than the first hook, and
the hooks selectively engage the notch at the rear end portion of the swing arm when the HDD experiences shocks while the magnetic head is parked, and the rear end portion of the swing arm that defines said notch and each of the hooks are configured such that each of the hooks restricts the rotation of the swing arm in only said second of the first and second directions of rotation when at least one of the hooks engages the swing arm within the bight of the notch.

* * * * *